Feb. 7, 1967    D. H. McKEOUGH ETAL    3,303,310
DUAL-PRESSURE CIRCUIT INTERRUPTER CONTROL DEVICE
Original Filed March 4, 1959    3 Sheets-Sheet 1
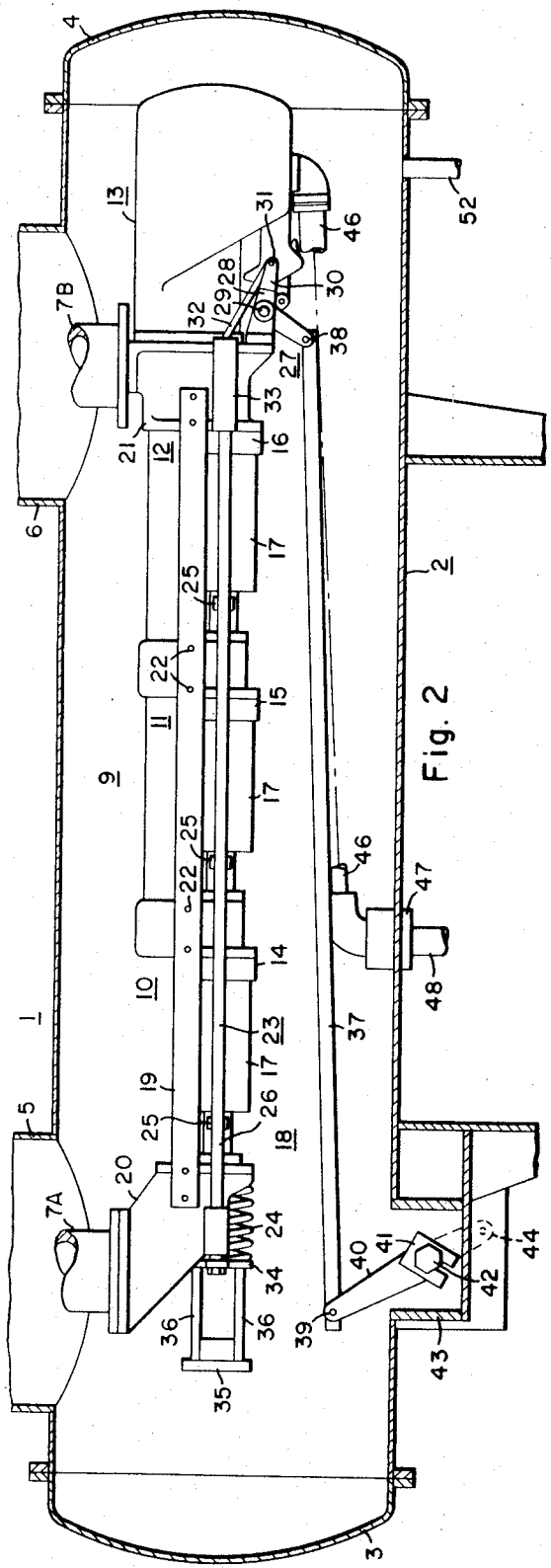
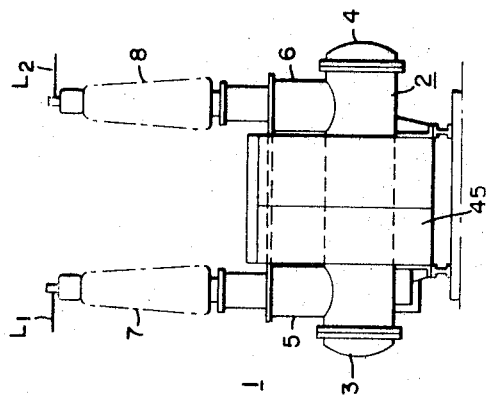

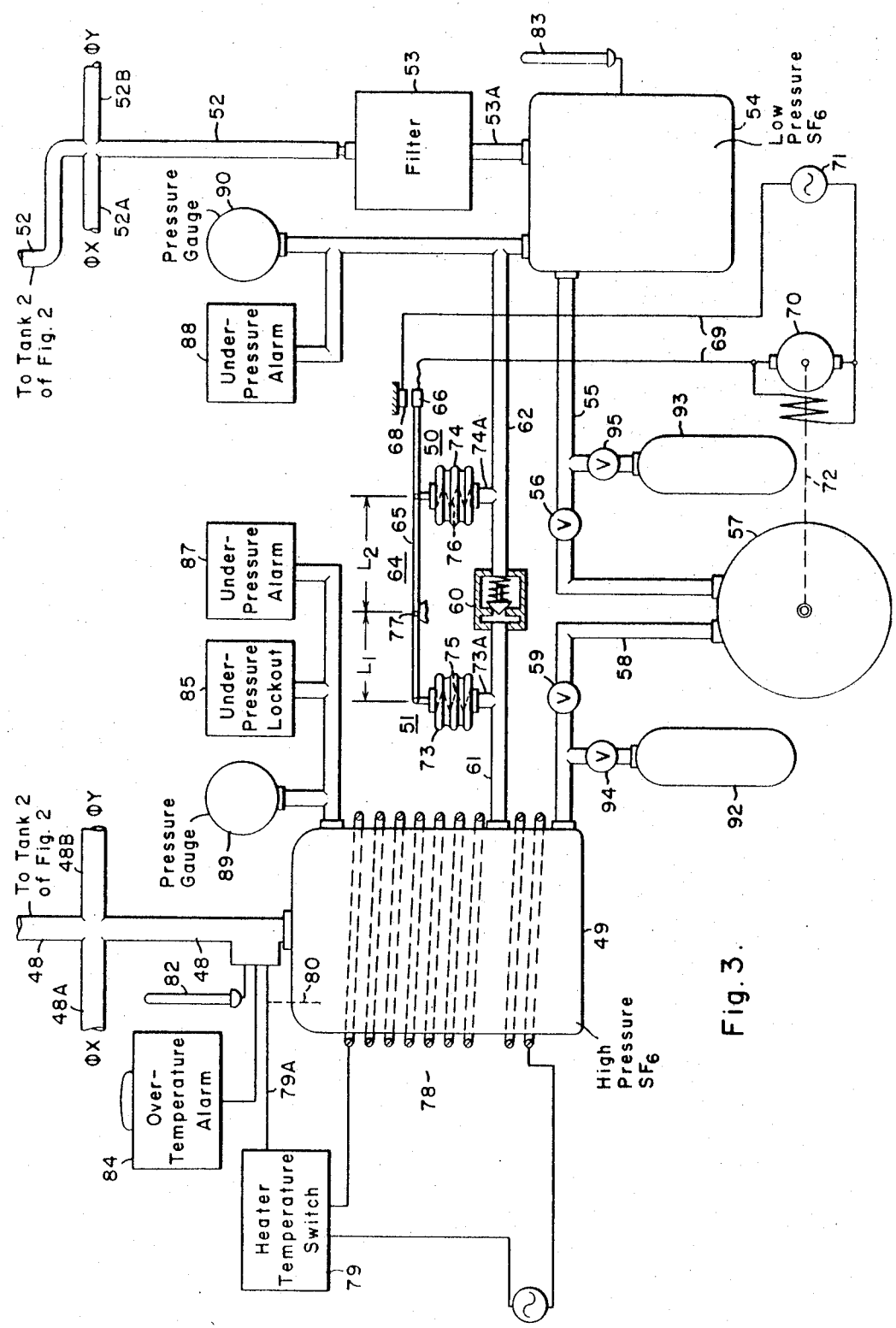

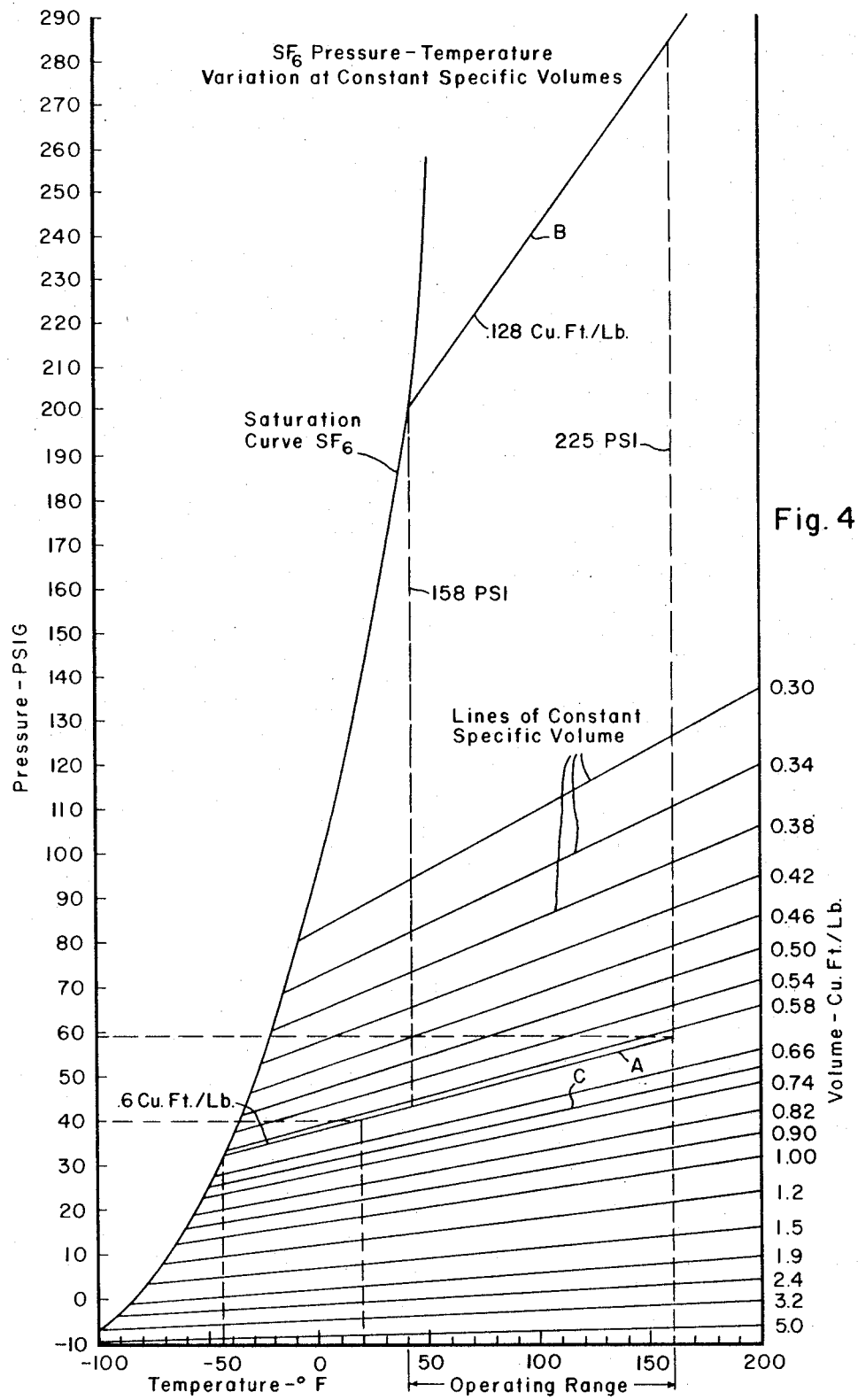

United States Patent Office 3,303,310
Patented Feb. 7, 1967

3,303,310
DUAL-PRESSURE CIRCUIT INTERRUPTER
CONTROL DEVICE
Daniel H. McKeough, Pasadena, Calif., and Benjamin P. Baker, deceased, late of Monroeville, Pa., by The Mellon National Bank and Trust Company, executor, Pittsburgh, Pa., assignors to Westinghouse Electric Corporation, Pittsburgh, Pa., a corporation of Pennsylvania
Continuation of abandoned application Ser. No. 797,061, Mar. 4, 1959. This application Jan. 21, 1963, Ser. No. 254,542
5 Claims. (Cl. 200—148)

This application is a continuation of United States patent application filed March 4, 1959, S.N. 797,061, now abandoned, by Daniel H. McKeough and Benjamin P. Baker.

This invention relates to dual-pressure gas systems for circuit interrupters in general, and more particularly to gas-pressure control devices for such dual-pressure gas systems.

The present invention has particularly useful application to a circuit-interrupting device, utilizing a high-pressure gas system for blasting high-pressure gas through one or more arcs, and exhausting such high-pressure gas, following interruption, into a relatively low-pressure gas system, wherein the exhausted gas, at such low pressure, serves as a dielectric medium for the prevention of breakdown between high and low voltage conducting parts.

It is a general object of the present invention to provide improved means for effecting the differential control of the gas densities in a dual-pressure gas system.

A more specific object of the present invention is to provide a differential-density control device, which is responsive simultaneously to both the high and low-pressures of the dual-pressure gas system for a compressed gas circuit interrupter.

A more specific object of the present invention is to effectively bring about the proper differential-density in a circuit-interrupting structure, utilizing a dual-pressure gas system.

Still another object of the present invention is the provision of an improved regulating device for controlling the high and low-pressure systems of a dual-pressure gas type of circuit interrupter.

In United States Patent 3,057,983, issued October 9, 1962, to Benjamin P. Baker, Russell N. Yeckley and Joseph Sucha entitled, "Circuit Interrupter," and assigned to the assignee of the present application, there is disclosed, and claimed, a novel dual-pressure type of gas circuit interrupting structure, in which a high-pressure gas system is provided and utilized to blast arcs during the circuit-interrupting operation. The gas, following the interruption process, is exhausted into a surrounding grounded tank structure, containing the interrupting assemblage, and pressurized at a relatively low gas pressure.

It is a further object of the present invention to provide an improved dual-density control device for the gas-type circuit-interrupting structure of the aforesaid Yeckley et al. patent.

In accordance with a particularly desirable embodiment of the invention, a dual-pressure circuit interrupter has a differential-density control switch including pressure connections from the high and low-pressure volumes connected at unequal lever-arm distances of a pivotally-mounted contact control arm of the switch. Such switch structure has the advantage of regulating the ratio of gas densities in the two pressure volumes.

Further objects and advantages will readily become apparent upon reading the following specification, taken in conjunction with the drawings, in which:

FIGURE 1 is an end elevational view of a three-phase, dual-pressure, gas-type of circuit interrupter, embodying the principles of the present invention;

FIG. 2 is a fragmentary, vertical sectional view taken through the grounded, horizontally extending tank structure of the circuit interrupter of FIG. 1, illustrating the internally disposed, arc-extinguishing assemblage in side elevation, with the contact structure being shown in the closed-circuit position;

FIG. 3 is a schematic partly diagrammatic view of the improved dual-pressure control system of the present invention as applied in this particular instance to a dual-pressure gas-type circuit interrupter, such as shown in FIG. 2; and, FIG. 4 is a graph illustrating the pressure-temperature variations of sulfur hexafluoride ($SF_6$) at constant specific volumes, and illustrating certain preferred gas-operating lines for the dual-pressure gas system of the circuit interrupter of FIG. 1.

Referring to the drawings, and more particularly to FIG. 1 thereof, the reference numeral 1 generally designates a dual-pressure, gas-type circuit-interrupting structure, including a grounded, horizontally extending tank structure 2 with hinged end caps 3, 4.

Extending upwardly from openings in the tank structure 2, and welded thereto, is a pair of supporting cylindrical extensions 5, 6 of steel, which support a spaced pair of terminal bushings 7, 8. The terminal bushings 7, 8 are employed to bring current from one phase of a transmission line, having connectors $L_1$ and $L_2$, into the circuit-interrupting structure 1, and through an arc-extinguishing assemblage, generally designated by the reference numeral 9, shown more clearly in FIG. 2, and electrically bridging the interior ends 7A and 7B of the terminal bushings 7, 8 respectively.

Generally, the arc-extinguishing assemblage 9 includes a plurality, in this particular instance three, of arc-extinguishing units 10, 11 and 12. Disposed at the right-hand end of the arc-extinguishing assemblage 9 is a high-pressure reservoir chamber, generally designated by the reference numeral 13. In this particular instance, the gas employed is sulfur hexafluoride ($SF_6$). As set forth in the aforesaid Yeckley et al. Patent 3,057,983, high-pressure sulfur hexafluoride gas is released, by the operation of a blast valve, from the high-pressure storage tank 13, and blasts three serially related arcs drawn within orifice structures 14, 15 and 16, associated with the arc-extinguishing units 10–12 respectively. The high-pressure sulfur hexafluoride gas, after being employed for arc-interruption purposes, is exhausted out of tubular guide sleeves 17, affixed to the orifice structures 14–16, and into the internal region 18 within the main body of the tank structure 2.

A pair of elongated insulating support bars 19, only one of which is shown in FIG. 2, extends between end support castings 20, 21 affixed to the lower interior ends 7A, 7B of the terminal bushings 7, 8. The pair of insulating support bars 19 maintain, by suitable bolts 22, the orifice structures 14–16 in their proper position. A generally ladder-shaped movable contact assemblage, generally designated by the reference numeral 23, moves reciprocally in a horizontal direction, being biased by an opening accelerating spring 24, toward the left, to effect opening of the three contact structures. One contact structure is associated with each arc-extinguishing unit 10, 11 or 12. Each contact structure includes a movable rod-shaped contact, not shown, secured to the mid-point of a cross-brace 25, which mechanically bridges a pair of insulating operating rods 26, forming a part of the aforesaid ladder-shaped movable contact assemblage 23.

The rod-shaped movable contacts, not shown, secured to the mid-points of the cross-braces 25, are pulled out of finger-type stationary contacts, associated with the arc-extinguishing units 10–12, and draw three serially related arcs through the orifice structures 14–16. The rod-shaped movable contacts move coaxially through the guide sleeves 17 to an open-circuit position, as described in detail in the foregoing Patent 3,057,983.

Simultaneously, with the opening, leftward motion of the ladder-shaped movable contact assemblage 23 occurs blast-valve opening, as brought about by the actuation of a pilot-valve assembly, generally designated by the reference numeral 27, and including a rotatable actuating main lever 28, pivotally mounted about a stationary pivot 29. The main actuating lever 28 has a pair of integral arms 30, which are pivotally connected, as at 31, to a pair of links 32, which, in turn, are pivotally connected to the right-hand ends of the insulating operating rods 26. The insulating operating rods 26, forming part of the ladder-shaped movable contact assemblage 23, are guided by guide rollers (not shown), moving reciprocally within bores provided by guide-casting extensions 33, integrally formed with the end-support casting 21. The accelerating spring 24 is stationarily seated, at its right-hand end, against the end support casting 20. The left-hand end of the opening accelerating spring 24 bears against a transversely extending spring plate 34, which extends between the left-hand ends of the two insulating operating rods 26. A bumper 35 is fixedly supported by support rods 36 from the end casting 20. The bumper 35 provides a cushioned stop for the ladder-shaped movable contact assemblage 23 at the end of the contact opening stroke.

An elongated insulating operating rod 37 is pivotally connected, as at 38, to the stationarily pivoted main actuating lever 28. The left-hand end 39 of the operating rod 37 is pivotally connected to an internally disposed crank-arm 40, which is clamped, as at 41, to a hexagonal operating shaft 42. The operating shaft 42 extends laterally through the side wall of a mechanical housing 43 by a gas-tight seal. An externally disposed crank arm 44 is clamped to the external end of the rotatable shaft 42, and is driven by a suitable operating mechanism provided within the mechanism housing 45, shown in FIG. 1. For the simultaneous actuation of a plurality of pole units controlling the three phases of the transmission line, an operating shaft, not shown, may extend between the three tank structures 2, each being of the type shown in FIG. 1, and is suitably mechanically connected to each of the three externally disposed crank-arms 44 for simultaneous actuation of all three pole units. FIG. 1 only shows the first of three identical tank structures 2, each of which encloses an arc-extinguishing assemblage of the type indicated at 9 in FIG. 2, which are simultaneously actuated, as mentioned.

Since high-pressure sulfur hexafluoride gas is taken from the high-pressure reservoir chamber 13 within each pole unit, by opening of the associated blast valve during a circuit-interrupter opening operation, means must be provided to replenish the used high-pressure gas within reservoir tank 13, and insulating supply line 46 fulfills this purpose. The high-pressure supply line 46 is connected to a flange support 47, secured to the tank wall 2, which, in turn, is connected to a pipe, or conduit 48, shown in FIG. 3 of the drawings. The conduit 48 may have a pair of branch extensions 48A, 48B extending to phases X and Y. In other words, each of the three tank structures 2 will have a high-pressure supply line 48, 48A or 48B to replenish the gas within the particular high-pressure reservoir tank 13, associated with the particular pole unit.

As illustrated in FIG. 3, the pipe 48 connects with a grounded high-pressure reservoir tank 49, disposed internally within the mechanism housing 45. As mentioned, the high-pressure gas, exhausted out of the arc-extinguishring units 10–12, is collected within the region 18, within tank structure 2, and tends to raise the pressure therein. A conduit 52 leads to the region 18, within tank structure 2, and, as shown in FIG. 3, connects with branches 52A, 52B, which lead to the adjoining tank structures 2. The conduit 52 leads to a filter 53, and from the filter 53, a pipe 53A connects with a low-pressure reservoir chamber 54.

A conduit 55, leading from low-pressure chamber 54, passes, by way of a hand valve 56, and into a compressor unit 57, which serves to recompress the low-pressure gas, supplied by conduit 55 and to force the recompressed gas, at high pressure, through a pipe 58, and through a second hand valve 59, into the interior of the high-pressure tank 49.

A regulating valve 60 is provided to regulate the pressures between the high and low-pressure systems. The pressure regulator 60 is connected, by means of a pipe 61 to the high-pressure tank 49. The pressure regulator 60 is also connected, by means of a pipe 62, with the low-pressure tank 54. A differential-density control device 64 is provided, in accordance with the principles of the present invention, to control the differential-density between the low and high-pressure systems. More particularly, the differential-density control device 64 includes a movable member or a pivotally-mounted contact arm 65, having a movable contact 66 at its right-hand extremity. The movable contact 66 makes, at times, contacting engagement with a relatively stationary contact 68, to complete a circuit 69. The circuit 69, in turn, connects a compressor motor 70 with a source of potential 71. The shaft 72, of the compressor motor 70, rotates the impeller within compressor 57, as well known by those skilled in the art.

In addition, the differential-density control device 64 includes a pair of resilient, metallic bellows 73 and 74, which have, respectively, conduit connections 73A, 74A with the pipes 61, 62, respectively, leading to the high-pressure tank 49 and to the low-pressure tank 54. Disposed internally within the metallic bellows 73 and 74 are biasing springs 75, 76, which are calibrated in a manner more fully described hereinafter. The pivotally mounted contact arm or control arm 65 is pivotally mounted at a stationary fulcrum point 77.

The dual-pressure circuit interrupting structure 1 of FIG. 1 is particularly advantageous, when operated with a highly effective and efficient gas such as sulfur hexafluoride ($SF_6$) gas, for the reasons set forth in the aforementioned patent. By way of recapitulation, the interrupting units 10–12 of the arc-extinguishing assemblage 9, shown in FIG. 2, depend upon a blast of sulfur hexafluoride gas from the high-pressure tank 13 to the region 18 at relatively low pressure within the main body of the tank 2.

In the present circuit-interrupting structure 1, the high-pressure source or system consists of a main reservoir tank 49 located at ground potential, and one small reservoir tank 13 per phase, located at high potential. This small high-pressure reservoir tank 13 is inside of, and insulated from, the larger tank 2, which is at ground potential. The enclosing tank 2 forms the major part of the low-pressure system. During arc interruption, the sulfur hexafluoride gas is blasted at high pressure through the three serially related arcs from the high-pressure reservoir 13, and into the low-pressure region 18 within tank structure 2.

The present invention is concerned with means for conserving the sulfur hexafluoride gas, and maintaining at all times the proper differential pressure between the high and low-pressure systems. This requirement is complicated by the physical characteristics of the sulfur hexafluoride gas, whose dielectric strength is a function of the pressure and density, whose interrupting ability is a function of the differential pressure between the high and low-pressure systems and the density, whose vapor pressure is a function of the temperature, and whose boiling point is rather high.

The pressure in the low-pressure system is determined by the minimum voltage-breakdown requirements, which depends not only upon the pressure, but also upon the geometrical configurations and spacing. In one particular application of the present invention, which involves a 230 kv., 15,000 mva. sulfur hexafluoride ($SF_6$) gas-type circuit interrupter, we have selected a constant density curve A (FIG. 4), which has a vapor pressure of 40 p.s.i.g. at $+20°$ F., 60 p.s.i.g. at $+160°$ F., and does not liquify until $-45°$ F., at which temperature the pressure is 30 p.s.i.g. This gives a satisfactory insulating condition over the entire temperature range between 20° and 160° F. However, it should be noted that if the dielectric requirements permit selecting a lower curve, such as C in FIG. 4, there would result gas economy, better differential pressure between the high and low-pressure systems, and lower liquefaction temperature.

The pressure within the high-pressure system is then determined by the differential requirements at the lowest operating temperature. In this case, we have selected curve B of FIGURE 4, which has a constant specific volume of 0.128 cu. ft./lb. from $+40°$ F. to $+160°$ F. At temperatures below $+40°$ F., the pressure and the density go down very rapidly, as the gas turns into liquid. It is, therefore, evident that a controlled amount of heat must be supplied to the high-pressure system to prevent liquefaction, and that some control over the pumping system must be provided to maintain the proper relation between curves A and B over the entire temperature range.

With reference to the schematic gas-control system set out in FIG. 3, it will be noted that the high-pressure reservoir tank 49, at ground potential, is connected to the high-pressure reservoir tank 13 in each of the three pole units, at high potential, by pipe 48 and its branch connections 48A, 48B and insulating tubes 46 (FIG. 2) disposed in each of the three tank structures 2. Insulating tube 46 is connected to the lowest point in high-pressure reservoir 13, and it, with all other piping, is inclined in such a way that any condensate in the high-pressure system is drained back into reservoir tank 49, which is supplied with a heater 78.

The heater 78 is designed to maintain the temperature of the gas within the high-pressure system at $+40°$ F. with an ambient temperature of $-50°$ F. The heater 78 is responsive to a temperature-control switch 79, whose thermal connection 79A may be inserted in either the high-pressure tank 49, as at 80, or within the lower end of the pipe 48, as shown by the full line in FIG. 3. If this thermal connection 79A is inserted within the pipe 48, as shown, and the high-pressure reservoir tank 49 is thoroughly insulated, any heating of the high-pressure reservoir chamber 13 above $+40°$ F., due to $I^2R$ losses in breaker, will expand the heated gas back into pipe 48 and turn off the heater 78. However, if high-pressure reservoir tank 49 is not thoroughly insulated, the temperatures within high-pressure tank 49 may drop below $+40°$ F. with pipe 48 registering above $+40°$ F., in which case liquefaction would occur within tank 49, and the total pressure throughout the high-pressure system would drop. If tank 49 is not thoroughly insulated, the thermal connection 79A of heat-control switch 79 should be inserted within tank 49 as at 80, even though the heater 78 may be on at times when the temperature of high-pressure chambers 13 do not require it.

During the opening operations, or as a result of a leak between the high and low-pressure systems, the pressure within the high-pressure system will drop, and the pressure within the low-pressure system will rise. In this case, equilibrium must be restored by the operation of the compressor 57. Since curve A in FIG. 4 is rather flat, the compressor 57 may be responsive to the absolute pressure within the low-pressure system, but this is only permissible if the volume of the high-pressure system is large in comparison to that of the low-pressure system. In the case of the particular circuit interrupter 1 under discussion, the reverse situation prevails, that is, the high-pressure system, for the foregoing example of a 230 kv., 15,000 mva. breaker, has 11.5 cu. ft. of volume at a density of 7.8 lbs. per cu. ft. The low-pressure system, on the other hand, has a volume of 216 cu. ft. at a density of 1.67 lbs. of sulfur hexafluoride gas per cu. ft. Therefore, if both the high-pressure and low-pressure systems are operating at 40° F., and the compressor 57 is set to cut in at 60 p.s.i.g., and the temperature of both systems rises to 160° F., the pressure of the high-pressure and low-pressure systems would equalize at about 52 p.s.i.g., and the compressor 57 would never start.

If the compressor 57 was made responsive to the high-pressure system, and was set to cut in at 200 p.s.i., or below, and both the high and low-pressure systems were operating at 160° F., the pressure could drop in the high-pressure system to 200 p.s.i.g., and the pressure within the low-pressure system would rise only approximately 2.5 p.s.i.g. This condition will be entirely satisfactory. In the present invention, we claim both of these methods, with their proper application as aforesaid, but recommend and particularly claim the method in which the compressor 57 is responsive to gas densities, or the ratio of pressures between the high and low-pressure systems.

As shown in FIG. 4, the difference in pressure between the high and low-pressure systems varies from 158 p.s.i. at 40° F. to 225 p.s.i. at $+160°$ F. Over this range, the densities and pressure ratios remain constant so long as the temperatures of the two systems remain about equal. In this case, we propose the use of the special pressure-differential switch 64. As shown in FIG. 3, this differential control switch 64 consists of two bellows 73, 74, mounted on the rocker arm 65 and spring balanced in such a way that the balance is maintained so long as the ratio of the densities within the two bellows 73, 74 is maintained. It will be noted that the lever-arm distances $L_1$ and $L_2$ are unequal to maintain the proper ratio of densities. If at any time the ratio of the low-pressure system to the high-pressure system is increased, the contacts 66, 68 close, and the compressor 57 is operated until the ratio is restored. It is, therefore, evident that the pressure of both systems can go up and down together, with changes in temperature, without upsetting the balance. If, however, the ambient temperature is low, and the interrupter 1 is either loaded, or the heater 78 is functioning, the ratio of the low-pressure system to the high-pressure system may go below normal, and the balance will be disturbed. This condition will only increase the pressure differential, and improve the interrupting ability. If, due to hot sunshine on the surface of the tank 2, the temperature of the gas within tank structure 2 should rise more rapidly than the temperature of high-pressure reservoir tank 13, the ratio of the low-pressure system to the high-pressure system will increase, and the compressor 57 will make a correction. This invention describes a differential gas density control switch, which accomplishes a new result, namely, compensation for pressure differences resulting from temperature changes alone. Because of the tendency of gases to expand or increase in pressure with rising temperature, control switches responding to pressure differential alone will give false indications of the need for pump operation. For example, rising temperature may counteract the effect of and so mask a considerable amount of leakage or discharge of gas from the high to the low-pressure system, which should call for operation of the pump to return this quantity of leaked or discharged gas to the high pressure system or reservoir. There is a need to maintain a proper difference in gas density between the high and low pressure systems as well as a pressure difference, and operation along constant density curves, illustrated in FIG. 4. The function of the "pressure-differential switch 64" is primarily to control the pressure or density ratio rather than just the pressure difference.

To understand the control of pressure or density ratio by the device 64 in FIG. 3, it must be observed that the fulcrum 77 is so placed that the bellows 73 and 74 act in opposition on the rocker beam 65 through lever arms of different lengths. Except for the biasing action of springs 75 and 76, whose influence is of secondary importance, control action results from upsetting the balance of torques around the fulcrum 77. If $L_1$ is the length of the lever arm to bellows 73, connected to the high pressure tank 49, and $L_2$ is the length of the lever arm to bellows 74, connected to the low pressure tank 54, this torque balance condition corresponds to the equation $$P_1 A_1 L_1 = P_2 A_2 L_2 \quad (1)$$

where $P_1$ = pressure in high-pressure tank 49
$P_2$ = pressure in low-pressure tank 54
$A_1$ = effective cross-section area of bellows 73
$A_2$ = effective cross-section area of bellows 74

If, as drawn in FIG. 3, $A_1 = A_2$, the pressure ratio for balance is determined only by the lever arm ratio according to $$P_1/P_2 = L_2/L_1 \quad (2)$$

From the perfect gas law, which may be assumed to represent the behavior of the actual gases used closely enough, $$P_1 V_1 = M_1 R T_1$$
and
$$P_2 V_2 = M_2 R T_2 \quad (3)$$

where $V_1$ and $V_2$ = respective volumes of high and low-pressure systems
$M_1$ and $M_2$ = respective masses of gas in high and low-pressure systems
$T_1$ and $T_2$ = respective absolute temperatures of high and low-pressure systems, and
R = gas constant depending only on units used.

(Strictly speaking, $P_1$ and $P_2$ in Equations 3 are the respective high and low pressures in absolute units while in Equations 1 and 2 they should be in gauge units (relative to atmospheric pressure), but at the pressure levels employed, at least several atmospheres, this distinction will make no essential difference in the operation of the device, either practically or in principle.) Where the high and low-pressure systems are at a common temperature and so $T_1 = T_2$, the Equations 3 show that $$P_1/P_2 = \frac{M_1/V_1}{M_2/V_2} = \frac{D_1}{D_2} \quad (4)$$

or that the pressure ratio of Equation 2 is also equal to the ratio of the gas density $D_1 = M_1/V_1$ in the high-pressure system to the gas density $D_2 = M_2/V_2$ in the low-pressure system. Thus, the balance device 64 also regulates the ratio of gas densities in the two pressure systems. That "differential gas density" is equivalent to gas density ratio can be shown by algebraic manipulation of the equations to give $$D_1 - D_2 = \frac{M(L_2 - L_1)}{L_2 V_1 + L_1 V_2} \quad (5)$$

where $M = M_1 + M_2$ is the total mass of gas in the two connected systems. Thus, fixing the lever arms $L_1$ and $L_2$ and also the system volumes $V_1$ and $V_2$ determines, for a given total quantity of gas, the density difference between the high and low-pressure systems, quite independent of the actual existing common temperature or the pressure difference. In other words, the action of the differential control switch 64 as shown in FIG. 3 is such as to control the differential gas density rather than the differential pressure.

In addition to the controls already described, there is provided two thermometers 82, 83, an over temperature alarm 84, an under-pressure lockout 85, two under-pressure alarms 87, 88, two pressure gauges 89, 90, and a pressure regulator 60.

In case of leaks to atmosphere, the under-pressure alarm switches 87, 88 will notify the operator; further leakage will operate the under-pressure lockout 85, which will prevent the interrupter 1 from attempting an operation with inadequate pressure differential. If the heater 78 should fail to cut off, the over-temperature alarm 84 will function. If the heater 78 should fail to turn on, and the entire pressure system drop, the alarms 87, 88 would sound. If the compressor 57 should fail to start after circuit-breaker operation, or leakage should occur from the high-pressure system to the low-pressure system, under-pressure alarm 87 would sound due to the decrease in pressure within the high-pressure system. If the compressor 57 should fail to stop, under-pressure alarm 88 would call for assistance before dangerous loss of dielectric in tank 2 should be evidenced. Also, pressure regulator 60 would return the gas from the high-pressure system to the low-pressure system through pipes 61 and 62. An activated aluminum filter 53 is placed in the low-pressure line 52 to pick up decomposed materials from arced gases. Portable refill bottles 92, 93, controlled respectively by hand valves 94, 95, are provided, as well as a portable service compressor, not shown.

During initial charging of the high and low-pressure systems with gas, making up for leakage, or diagnosing troubles, thermometers 82, 83 and pressure indicating gauges 89, 90 will be used in conjunction with curves A and B in FIG. 4. These will give proper pressures for any temperatures.

From the foregoing description of the gas-control system for the low and high-pressure gas systems, it will be apparent that complete control is obtained for any possible operating conditions which may occur. Safety precautions have been provided, and practically foolproof operation is assured. Although the control system has been particularly described in connection with the use of sulfur hexafluoride ($SF_6$) gas in a circuit-interrupting structure, it will be obvious to those skilled in the art that certain features of the present invention will be applicable to the control of other circuit-interrupter gas systems, employing other arc-extinguishing gases than sulfur hexafluoride ($SF_6$).

The present invention has particular applicability, as applied to a dual-system gas-type of circuit interrupting structure, in which high-pressure gas is blasted out of a high-pressure reservoir tank, through one or more arcs for interruption purposes, and exhausted into a low-pressure system, which ultimately feeds low-pressure gas to a compressor for the recompression of this gas.

The particular density-differential control switch 64 is sensitive, thereby providing high accuracy in control. As a result, the successful operation of the circuit-interrupting structure 1 is assured throughout the entire operating range.

Although there has been illustrated and described a particular control system for controlling the differential density in a dual-pressure gas system, it is to be clearly understood that the same was merely for the purpose of illustration, and that changes and modifications may readily be made therein by those skilled in the art, without departing from the spirit and scope of the invention.

We claim as our invention:

1. A dual-pressure type of gas-blast circuit interrupter including means defining a first gas space at one pressure and a second gas space at a higher pressure, separable contact means, blast-valve means for controlling a blast of gas out of said second gas space through the arc established at said separable contact means to exhaust into the first gas space, a gas compressor for recompressing the gas from the first gas space and forcing it under pressure into the second gas space, and a density-ratio switch to regulate the ratio of gas densities in the two gas spaces for electrically controlling operation of the gas compressor.

2. A dual-pressure type of gas-blast circuit interrupter including means defining a first gas space at one pressure and a second gas space at a higher pressure, separable contact means, blast-valve means for controlling a blast of gas out of said second gas space through the arc established at said separable contact means to exhaust into the first gas space, a gas compressor for recompressing the gas from the first gas space and forcing it under pressure into the second gas space, and a density-ratio switch including a pivotally-mounted contact arm and pressure connections from said spaces acting at unequal lever arm distances from the fulcrum point to regulate the ratio of gas densities in the two gas spaces for electrically controlling operation of the gas compressor.

3. The combination of claim 2, wherein the low-pressure connection is at a greater lever arm distance from the fulcrum point than the high-pressure connection.

4. In a dual-pressure compressed-gas circuit interrupter of the type having a pair of separable contacts cooperable to establish an arc, means defining a substantially closed volume containing high-pressure gas, blast-valve means operable to send an arc-extinguishing blast of compressed gas from said volume toward said arc to effect the extinction thereof, means defining a substantially closed exhaust volume for collecting the blast gas following arc extinction purposes, compressor means for extracting exhausted gas from the exhaust volume and pressurizing the same to the high-pressure level requisite for extinction purposes, the combination therewith of a differential density control system for controlling the differential density level of said two volumes in the proper ratio over an operating temperature range irrespective of pressure fluctuation with temperature so that the two volumes will be maintained along constant density operating lines during operation of the interrupter.

5. The combination according to claim 4, wherein the differential density control system comprises an expandable bellows means connected to the high-pressure volume, another expandable bellows means connected to the low-pressure volume, and a pivotally-mounted control switch arm connected mechanically to said two expandable bellows means with unequal lever-arm distances.

References Cited by the Examiner

UNITED STATES PATENTS

| | | | |
|---|---|---|---|
| 1,820,063 | 8/1931 | Geiler | 200—83.33 |
| 2,108,560 | 2/1938 | Kesselring | 200—148.7 |
| 2,517,739 | 8/1950 | Tyrner et al. | 200—81 X |
| 2,635,153 | 4/1953 | Wilson | 200—81.9 |
| 2,757,261 | 7/1956 | Lingal et al. | 200—148 |
| 2,773,251 | 12/1956 | Snyder | 200—81.9 |
| 2,824,937 | 2/1958 | Strom | 200—148 |
| 2,955,182 | 10/1960 | Caswell et al. | 200—148 |

FOREIGN PATENTS

| | | |
|---|---|---|
| 543,922 | 3/1942 | Great Britain. |
| 885,933 | 1/1962 | Great Britain. |
| 269,814 | 12/1929 | Italy. |

ROBERT K. SCHAEFER, *Primary Examiner.*

BERNARD A. GILHEANY, *Examiner.*

R. S. MACON, *Assistant Examiner.*